(12) United States Patent
Shestak et al.

(10) Patent No.: US 7,750,981 B2
(45) Date of Patent: Jul. 6, 2010

(54) HIGH-RESOLUTION AUTOSTEREOSCOPIC DISPLAY

(75) Inventors: Sergey Shestak, Suwon-si (KR); Dae-sik Kim, Suwon-si (KR); Tae-hee Kim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 668 days.

(21) Appl. No.: 11/498,818

(22) Filed: Aug. 4, 2006

(65) Prior Publication Data

US 2007/0035672 A1 Feb. 15, 2007

(30) Foreign Application Priority Data

Aug. 4, 2005 (KR) ............... 10-2005-0071484

(51) Int. Cl.
*G02F 1/1335* (2006.01)
(52) U.S. Cl. .......................... 349/15; 349/57
(58) Field of Classification Search ............ 349/15
See application file for complete search history.

(56) References Cited

U.S. PATENT DOCUMENTS

| | | | | |
|---|---|---|---|---|
| 5,751,388 | A * | 5/1998 | Larson | 349/96 |
| 6,124,920 | A * | 9/2000 | Moseley et al. | 349/201 |
| 7,215,475 | B2 * | 5/2007 | Woodgate et al. | 359/624 |
| 7,250,923 | B2 * | 7/2007 | Taira et al. | 345/6 |
| 7,345,654 | B2 * | 3/2008 | Taira et al. | 345/6 |
| 2004/0100598 | A1 * | 5/2004 | Adachi et al. | 349/113 |
| 2004/0222945 | A1 * | 11/2004 | Taira et al. | 345/6 |
| 2006/0152812 | A1 * | 7/2006 | Woodgate et al. | 359/619 |
| 2007/0146234 | A1 * | 6/2007 | Taira et al. | 345/6 |
| 2008/0211736 | A1 * | 9/2008 | Taira et al. | 345/6 |
| 2008/0273242 | A1 * | 11/2008 | Woodgate et al. | 359/495 |

FOREIGN PATENT DOCUMENTS

| | | |
|---|---|---|
| JP | 2000-102038 A | 4/2000 |
| JP | 2004-325494 A | 11/2004 |
| KR | 10-2000-0075117 A | 12/2000 |
| KR | 10-2005-0013875 A | 2/2005 |
| KR | 10-2005-0016952 A | 2/2005 |

* cited by examiner

*Primary Examiner*—K. Cyrus Kianni
(74) *Attorney, Agent, or Firm*—Sughrue Mion, PLLC

(57) ABSTRACT

A high-resolution autostereoscopic display is provided. The autostereoscopic display includes a controller; a display panel receiving an image signal from the controller, forming an image, and including pixels and an inactive area between the pixels; a polarizer polarizing light emitted from the display panel to have a first polarization; a polarization switching controller; a polarization switch selectively converting the light with the first polarization into light with a second polarization in response to the electrical control of the polarization switching controller; a selection controller; a first electro-optical birefringent layer having an optical axis that direction is changed by an electrical control of the selection controller and including a plurality of first lenticular lenses separated by a predetermined pitch; and a second electro-optical birefringent layer having an optical axis that direction is changed by the electrical control of the selection controller, includes a plurality of second lenticular lenses that are arranged with the same pitch as the first lenticular lenses are and shifted by half the pitch from the first lenticular lenses.

16 Claims, 9 Drawing Sheets

HIGH-RESOLUTION AUTOSTEREOSCOPIC DISPLAY

CROSS-REFERENCE TO RELATED PATENT APPLICATIONS

This application claims the benefit of Korean Patent Application No. 10-2005-0071484, filed on Aug. 4, 2005, in the Korean Intellectual Property Office, the disclosure of which is incorporated herein in its entirety by reference.

BACKGROUND OF THE INVENTION

1. Field of the Invention

The present invention relates to an autostereoscopic display, and more particularly, to an autostereoscopic display which allows conversion between a two-dimensional (2D) mode and a three-dimensional (3D) mode without a decrease in resolution and is manufactured as a flat panel for television, computer graphics, and other applications.

2. Description of the Related Art

An effective method of providing a stereoscopic image through a flat panel display is a lenticular method using a lenticular lens array located between an image panel and a viewer to separate a viewing zone of a left eye image from a viewing zone of a right eye image in a stereopair. In the lenticular method, a right eye image and a left eye image are provided to the viewer's right and left eyes, respectively. Conventionally, two images of the stereopair are displayed on one image panel such that one set of columns, e.g., odd columns, displays a left eye image and another set of columns, e.g., even columns, displays a right eye image. Since the left eye image and the right eye image are displayed on one panel, the resolution of each image is half of the resolution of the panel.

The recent development of a liquid crystal display (LCD) panel with fast response facilitates the display of a stereoscopic image with a full resolution of the panel by using a frame-sequential operation, and continuously alternately displaying a left eye image and a right eye image. Here, both of the left eye image and the right eye image are displayed with the full resolution of the display panel. To display a frame sequentially, a unit for selectively switching and displaying the left eye image and the right eye image is needed.

FIG. 1 illustrates a prior autostereoscopic display disclosed in U.S. Pat. No. 5,457,574. The prior autostereoscopic display includes an LCD panel 11 forming an image, a lenticular lens sheet 12 separating a viewing zone of a left eye image and a viewing zone of a right eye image, first and second light sources 13a and 13b connected to a light source controller 14 to be switched on and off, and an image signal controller 15 transmitting an image signal to the LCD panel 11.

The first and second light sources 13a and 13b alternately emit light in synchronization with a frame generation rate of the LCD panel 11. The light from the light source 13a or 13b is converged into a vertical line (i.e., a column) of the LCD panel 11 by the lenticular lens sheet 12. In other words, a pixel column is displayed by the lenticular lens sheet 12. This process results in the generation of two sets of light lines, each of which is displayed as a pixel column by the lenticular lens sheet 12. Each of an observer's eyes 16a and 16b alternately sees an image through odd sets of columns and even sets of columns when the first and second light sources 13a and 13b are alternately turned on and off. One of the eyes, 16a or 16b, sees the light lines serving as backlight first behind the odd, then behind the even sets of columns of the LCD panel 11, while the other eye sees an image first through the light lines behind the even, then behind the odd sets of the columns. The image signal controller 15 rapidly changes the left and right eye images displayed on the odd and even columns and generates synchronization signals for the light source controller 14 to synchronize the switching of the light sources 13a and 13b. As a result, the observer sees a full set of LCD pixels and an image with the full resolution of the LCD panel 11.

The above-described prior technology is based on a directional backlight which is usually very thick and is more complicated to manufacture than a conventional diffuse backlight for an LCD. The directional backlight includes at least two separate light sources or a single light source having a diagram array that can be switched such that an effective horizontal position of a light source can be shifted in synchronization with the provision of graphic data. Since the position of a viewing zone is determined by the position of a light source, each of a viewer's eyes can alternatively perceive an image displayed through different sets of pixels, and therefore, the viewer can see a full-resolution image. However, the prior technology based on the directional backlight has drawbacks due to complicated manufacturing and large size.

SUMMARY OF THE INVENTION

An aspect of the present invention provides a thin autostereoscopic display which displays a stereoscopic image having full resolution and allows conversion between a two-dimensional mode and a three-dimensional mode.

According to an aspect of the present invention, there is provided an autostereoscopic display including a controller; a display panel receiving an image signal from the controller, forming an image, and including pixels and an inactive area between the pixels; a polarizer polarizing light emitted from the display panel to a first polarization; a polarization switching controller; a polarization switch selectively converting the light with the first polarization into light with a second polarization in response to the electrical control of the polarization switching controller; a 2D-3D mode selection controller; a first electro-optical birefringent layer which optical birefringence is particularly characterized with a direction of optical axis hereinafter referred as crystal optical axis that is changed by an electrical control of the 2D-3D mode selection controller and including a plurality of first lenticular lenses separated by a predetermined pitch; and a second electro-optical birefringent layer which birefringence is changed by the electrical control of the 2D-3D mode selection controller and including a plurality of second lenticular lenses that are arranged with the same pitch as the first lenticular lenses and shifted by half the pitch from the first lenticular lenses.

The autostereoscopic display may further include an optical layer for compensation of optical power of first and second birefringent electro-optical layers in respect to the light polarized as ordinary ray, disposed between the first electro-optical birefringent layer and the second electro-optical birefringent layer, hereinafter referred as separator. The separator material has a refractive index equal to a refractive index of ordinary ray (ne) of the first and second electro-optical birefringent layers.

The first and second electro-optical birefringent layers may have positive refractive power or negative refractive power. The profile of the separator may correspond to the profiles of the first and second electro-optical birefringent layers. The separator may include a plane glass substrate and sub-separators on both sides of the plane glass substrate. The sub-separators may have convex profiles or concave profiles. The controller may transmit a sync signal to the polarization switching controller, and the pitch of the first and second lenticular lenses may be equal to or less than a horizontal pitch between the pixels of the display panel.

The pitch of the first and second lenticular lenses may satisfy the following equation:

$$P_L = \frac{P_0}{1+\left(\frac{T}{L}\right)},$$

where $P_L$ is the pitch of the first and second lenticular lenses, $P_0$ is the horizontal pitch between the pixels of the display panel, T is the optical distance from the pixels to the vertices of the first lenticular lenses, L is a viewing distance.

The first electro-optical birefringent layer may have a refractive index corresponding to ordinary ray (no) with respect to light having the first polarization and have a refractive index corresponding to extraordinary ray (ne) with respect to light having the second polarization and the second electro-optical birefringent layer may have thel refractive index corresponding to extraordinary ray (ne) with respect to light having the first polarization and have the refractive index corresponding to ordinary ray (ne) with respect to light having the second polarization according to a voltage control of the 2D-3D mode selection controller.

The first and second electro-optical birefringent layers may have a refractive index corresponding to ordinary ray (no) with respect to light, regardless of the polarization of the light, to display an image in a two-dimensional mode according to the voltage control of the 2D-3D mode selection controller.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
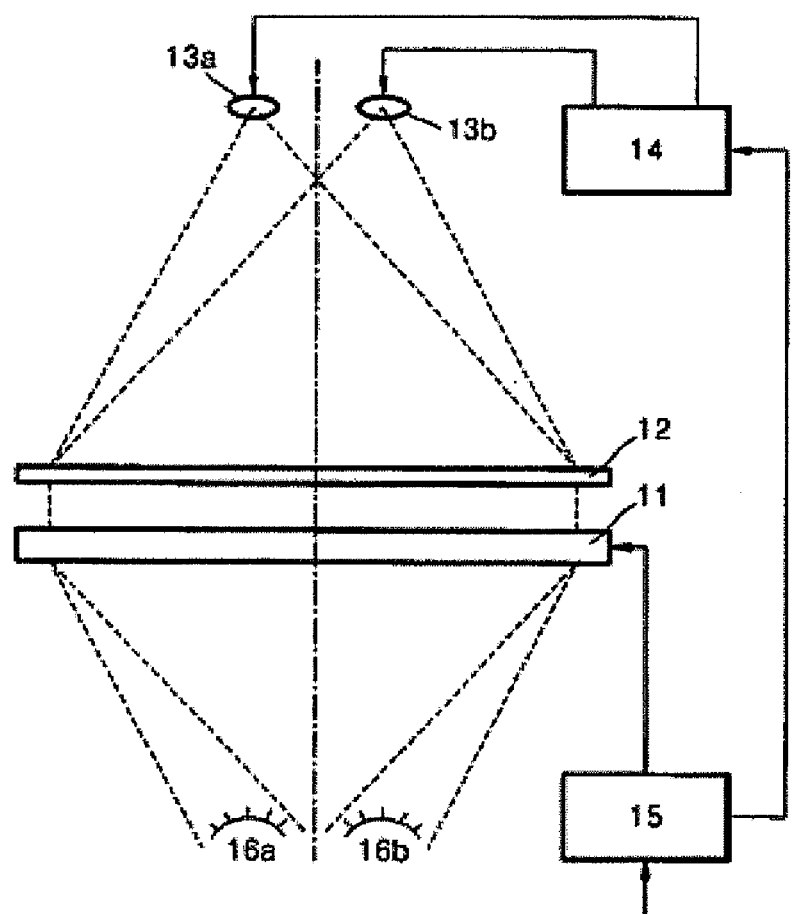
FIG. 1 is a top view of a prior autostereoscopic display disclosed in U.S. Pat. No. 5,457,574.
Figure 2:
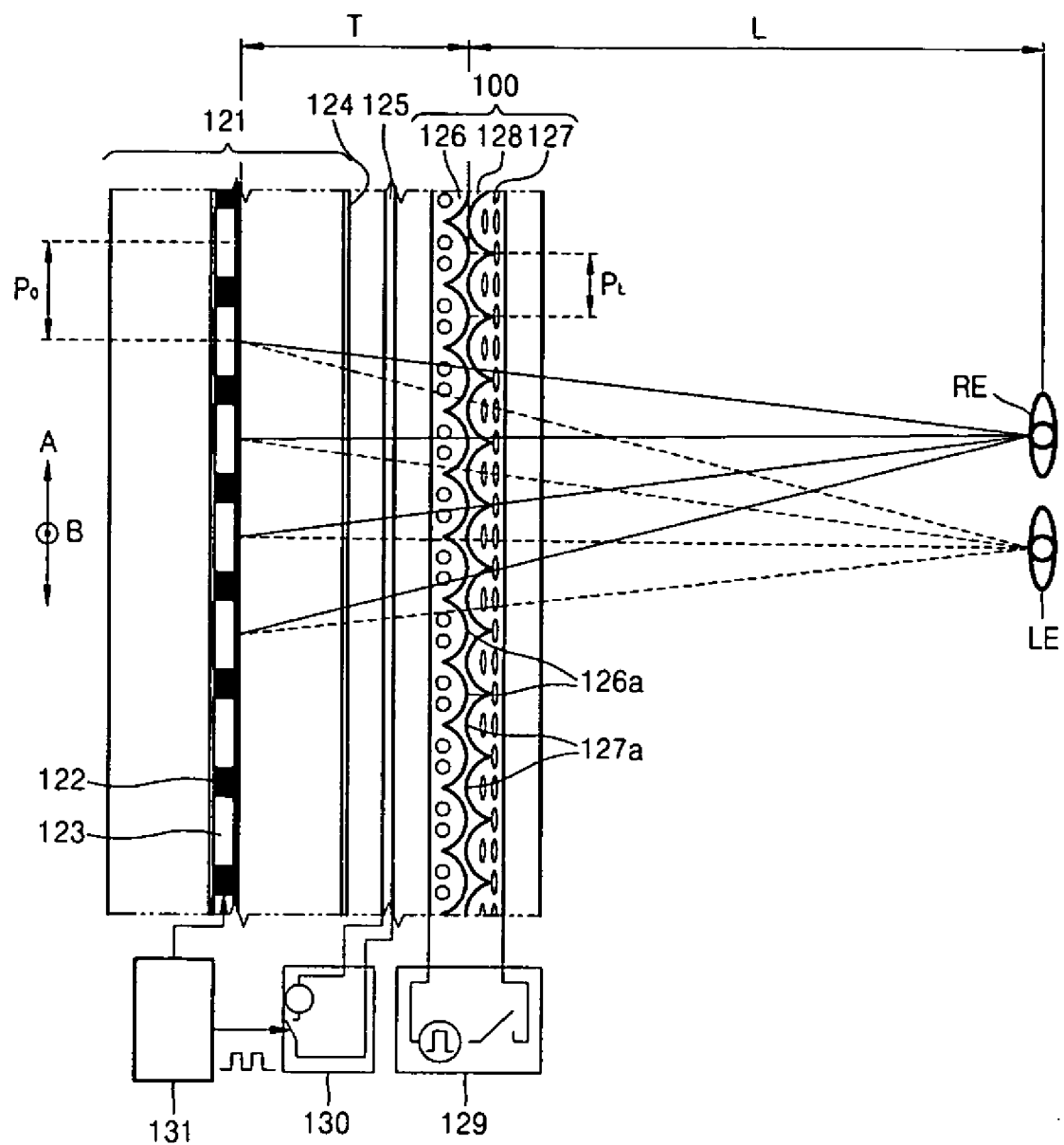
FIG. 2 is a top view of an autostereoscopic display according to an exemplary embodiment of the present invention.

Referring to FIG. 2, an autostereoscopic display according to an exemplary embodiment of the present invention includes a display panel 121, a polarizer 124 polarizing light emitted from the display panel 121 in one direction, a polarization switch 125 switching the polarization of the polarized light, and an electro-optical birefringent unit 100 with varying refraction characteristics according to the polarization of incident light.

The display panel 121 electrically modulates light to form an image and may be implemented as a plasma display panel (PDP), organic light emitting display (OLED) panel, field emission display panel (FED) which requires the polarizer 124 to be installed as well as a liquid crystal display (LCD) or a ferro-electric LCD (FELCD), which conventional structure already includes the polarizer 124 as output polarizer. The display panel 121 includes pixels 122 arranged in rows and columns and an inactive area 123 disposed between the pixels 122. The inactive area 123 blocks incident light, and may be e.g. a black matrix in an TFT LCD panel. A controller 131 applies a driving voltage to the display panel 121.

The polarizer 124 polarizes light emitted from the display panel into a first polarization direction. The first polarization direction of light is maintained or is converted into a second polarization direction of light by the polarization switch 125. The polarization switch 125 is turned on or off by a polarization switching controller 130.

The electro-optical birefringent unit 100 includes first and second electro-optical birefringent layers 126 and 127 disposed to face each other and a separator 128 disposed between the first and second electro-optical birefringent layers 126 and 127. The first and second electro-optical birefringent layers 126 and 127 are shaped like a lenticular plate. In other words, the first electro-optical birefringent layer 126 is formed such that a plurality of first lenticular lenses 126a are arranged in a line and the second electro-optical birefringent layer 127 is formed such that a plurality of second lenticular lenses 127a are arranged in a line. The first and second lenticular lenses 126a and 127a are arranged vertically (i.e., in a B direction) in the autostereoscopic display, side by side. The pitch between centers of adjacent lenticular lenses is $P_L$, and the first lenticular lenses 126a and the second lenticular lenses 127a have the same pitch and the same shape. The first and second electro-optical birefringent layers 126 and 127 are parallel to each other and are displaced horizontally (i.e., in an A direction) from each other by half the pitch ($\frac{1}{2}P_L$). In other words, the second lenticular lenses 127a are displaced from the first lenticular lenses 126a, by $\frac{1}{2}P_L$.

The number of the first lenticular lenses 126a in the first electro-optical birefringent layer 126 and the number of the second lenticular lenses 127a in the second electro-optical birefringent layer 127 may be the same or greater as the number of pixels in a row (i.e., a horizontal line) of the display panel 121. The lenticular lens pitch, $P_L$, is a little smaller than the pitch of the pixels 122 in the horizontal direction. Specifically, the autostereoscopic display may be designed such that the following equation is satisfied:

$$P_L = \frac{P_0}{1+\left(\frac{T}{L}\right)},$$

where $P_0$ is a horizontal pixel pitch of the display panel 121, T is an optical distance from the pixels 122 to the first lenticular lenses 126a, L is a viewing distance.

The first and second electro-optical birefringent layers 126 and 127 selectively have birefringent and electro-optical characteristics and may be implemented as two liquid crystal layers, confined between two transparent substrates with transparent electrodes and separated by separator. A characteristic of the present exemplary embodiment is that first electro-optical birefringent layer 126 has the refractive index higher than the refractive index of separator with respect to only light polarized in a direction perpendicular to a picture plane, i.e., with respect to the light polarized in first direction. Also, the first electro-optical birefringent layer has not an optical power with respect to the light polarized parallel to a picture plane in the absence of an external electric field applied to the electro-optical birefringent layer. The second electro-optical birefringent layer 127 has an optical power with respect to only light polarized in a direction parallel to a picture plane, i.e., the second polarization direction, while does not having an optical power with respect to light polarized in the first direction. This may be achieved if the crystal optical axis of the first electro-optical birefringent layer 126, is perpendicular to the crystal optical axis of the second electro-optical birefringent layer 127. In application to liquid crystal this is corresponding to the perpendicular orientation of director in the liquid layer 126 in respect to the liquid crystal layer 127. The perpendicular orientation of directors may be provided by different orientation of the alignment layers in the liquid crystal lenses 126 and 127. The electro-optical characteristics of the first and second electro-optical birefringent layers 126 and 127 are controlled by a 2D-3D mode selection controller 129. Alternatively, the crystal optical axes of the respective first and second electro-optical birefringent layers 126 and 127 may have the same orientation along the ordinary direction or even the optical birefringence disappear. In this case, polarization direction control by the polarization switch 125 and electro-optical conversion control of the first and second electro-optical birefringent layers 126 and 127 are different from those in the case where the crystal optical axes are perpendicular to each other.

Ordinary light beams polarized perpendicular to the crystal optical axis of the first or second electro-optical birefringent layer 126 or 127, are transmitted through the first or second electro-optical birefringent layers 126 or 127 according to a ordinary refractive index (no) without refraction, while extraordinary light beams polarized parallel to the crystal optical axis of the first or second electro-optical birefringent layer 126 or 127 are refracted according to an extraordinary refractive index (ne). The first and second electro-optical birefringent layers 126 and 127 are controlled by the 2D-3D mode selection controller 129 to be alternately oriented in the direction of the crystal optical axis. The separator 128 has a refractive index equal to the ordinary refractive index (no).

Figure 3A:
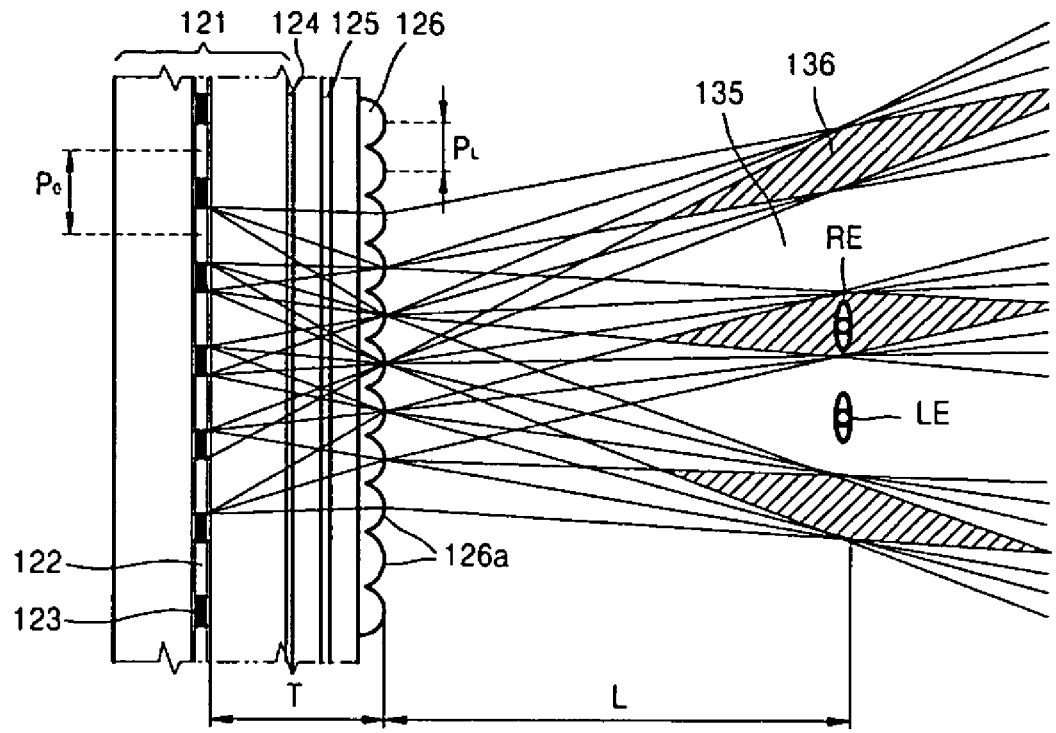
FIG. 3A illustrates the operation of a first electro-optical birefringent layer included in the autostereoscopic display illustrated in FIG. 2.
Figure 3B:
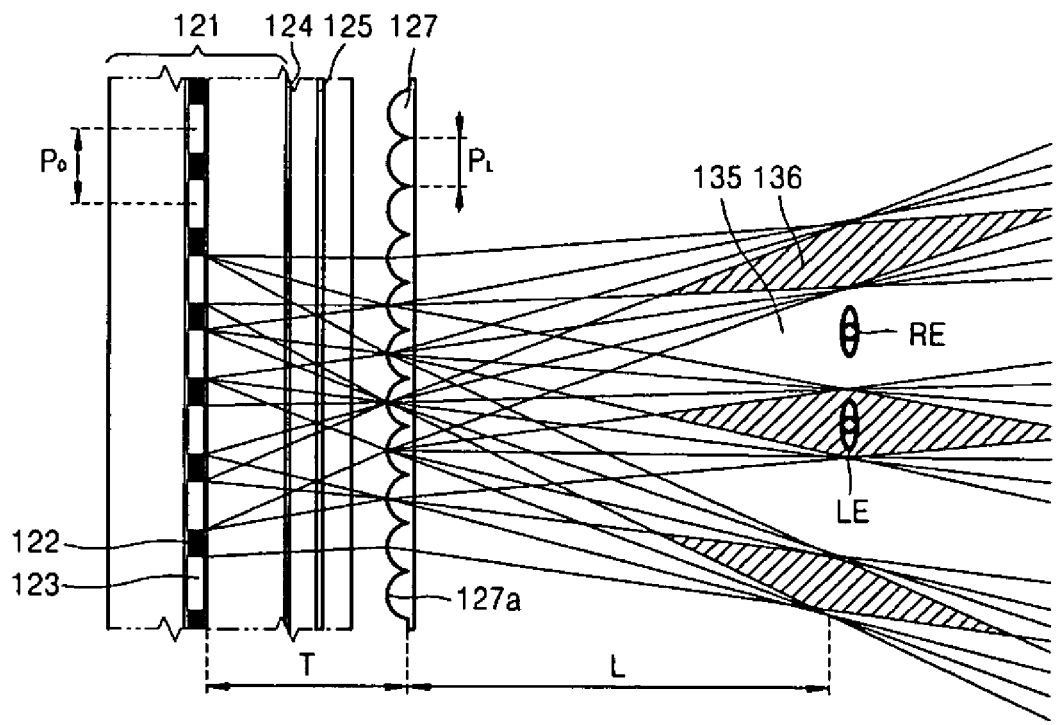
FIG. 3B illustrates the operation of a second electro-optical birefringent layer included in the autostereoscopic display illustrated in FIG. 2.

The effects of the display panel according to the exemplary embodiment of the invention will be described with reference to FIGS. 3A and 3B. FIG. 3A illustrates the formation of a viewing zone by the first electro-optical birefringent layer 126 when $t=t_1$, for example, when a left eye image is perceived by a left eye LE. FIG. 3B illustrates the formation of a viewing zone by the second electro-optical birefringent layer 127 when $t=t_2$, for example, when a right eye image is perceived by a right eye RE.

The controller 131 inputs an image signal for a first frame image for a left eye to the display panel 121, which forms the first frame image for the left eye. The controller 131 transmits graphic data at a high rate. The frame rate of the display panel may be at least double the conventional frame rate, e.g., 120 Hz, needed to prevent image flickering, that may be perceived if, the frame rate is 60 Hz. In other words, a full period for displaying both a left eye image and a right eye image is sufficient (e.g., 1/60 s) for a viewer to perceive a stereoscopic image having a full resolution without flickering. In addition, the controller 131 sends a sync pulse to the polarization switching controller 130 so that the polarization switch 125 is switched in synchronization with the transmission of the image signal.

Light of the first frame image for the left eye is polarized for example, in first direction by the polarizer 124. The polarization switching controller 130 turns off the polarization switch 125 so that the light polarized in first direction is incident on the electro-optical birefringent unit 100 without changing its polarization.

When the left eye image is displayed and the polarization switch 125 does not change the polarization of the polarized light, as shown in FIG. 3A, the light rays polarized in first direction are extraordinary rays with respect to the first electro-optical birefringent layer 126. Here, the crystal optical axis of the second electro-optical birefringent layer 127 is perpendicular to the crystal optional axis of the first electro-optical birefringent layer 126, and therefore, the light polarized in first direction is polarized as ordinary beam with respect to the second electro-optical birefringent layer 127.

Meanwhile, since the refractive index of birefringent electrooptical layer with respect to the light polarized as ordinary ray is equal to the refractive index of the separator 128, the second lenticular lenses 127a in the second electro-optical birefringent layer 127 do not affect light. As a result, the second electro-optical birefringent layer 127 operates as a transparent flat plate. Accordingly, to simplify the description, the second electro-optical birefringent layer 127 is not illustrated in FIG. 3A. The operation of the first electro-optical birefringent layer 126 is performed within 1/120 seconds.

Next, light of a second frame image for a right eye is polarized t, for example, in a first direction (first polarization) by the polarizer 124. The polarization switching controller 130 turns on the polarization switch 125 so that the light with first polarization is converted to the light with second polarization and the light with second polarization is incident on the electro-optical birefringent unit 100. Here, the light rays with second polarization are ordinary rays with respect to the first electro-optical birefringent layer 126 and extraordinary rays with respect to the second electro-optical birefringent layer 127. Since the ordinary refractive index (no) is equal to the refractive index of the separator 128, the first lenticular lenses 126a in the first electro-optical birefringent layer 126 do not have optical power. As a result, the first electro-optical birefringent layer 126 operates as a transparent flat plate while the second electro-optical birefringent layer 127 operates as a lenticular plate. Accordingly, to simplify the description, the first electro-optical birefringent layer 126 is not illustrated in FIG. 3B.

As described above, the first and second electro-optical birefringent layers 126 and 127 alternately show the characteristics of lenticular lens array with respect to the first polarized light and the second polarized light, thereby forming shifting viewing zones. Since the first and second electro-optical birefringent layers 126 and 127 are displaced by half the pitch, selectively shifted viewing zones are generated. A first viewing zone 135 and a second viewing zone 136 are generated by the first (in FIG. 3A) or second (in FIG. 3B) lenticular lenses 126a and 127a. The lateral positions of viewing zones 136 and 135 in FIG. 3A and in FIG. 3B in respect to viewer's eyes are mutually shifted accordingly to the mutual shift of the first and second electro-optical birefringent layers 126 and 127. Each light emitted from the pixels 122 and the inactive area 123 of the display panel 121 and transmitted through the vertexes of the first or second lenticular lenses 126a or 127a, forms the first and second viewing zones 135 and 136. An eye disposed in the first viewing zone 135 sees only the pixels 122 of the display panel 121 and an eye placed in the second field 136 sees only the inactive area 123, i.e., a black matrix of the display panel 121.

For example, as shown in FIG. 3A, due to the operation of the first electro-optical birefringent layer 126, the left eye LE disposed in the first viewing zone 135 receives light from all of the pixels 122 of the display panel 121 while the right eye RE disposed in the second viewing zone 136 sees only the black matrix of the display panel 121. Subsequently, as shown in FIG. 3B, due to the operation of the second electro-optical birefringent layer 127, the right eye RE disposed in the first viewing zone 135 receives light from all of the pixels 122 of the display panel 121 while the left eye LE disposed in the second viewing zone 136 sees only the black matrix of the display panel 121. The controller 131 sends an image signal of the second frame for the right eye image of the stereopair and simultaneously sends a sync signal to the polarization switching controller 130 to drive the polarization switch 125. The 2D-3D mode selection controller 129 changes or does not change the crystal optical axis of the first and second electro-optical birefringent layers 126,127. The operating principle of the second electro-optical birefringent layer 127 is similar to that of the first electro-optical birefringent layer 126. However, since the second lenticular lens 127a are displaced from the first lenticular lenses 126a by half the pitch, the first viewing zone 135 and the second viewing zone 136 are shifted so that the left eye LE sees the black matrix and the right eye RE sees the pixels 122.

Figure 4A:
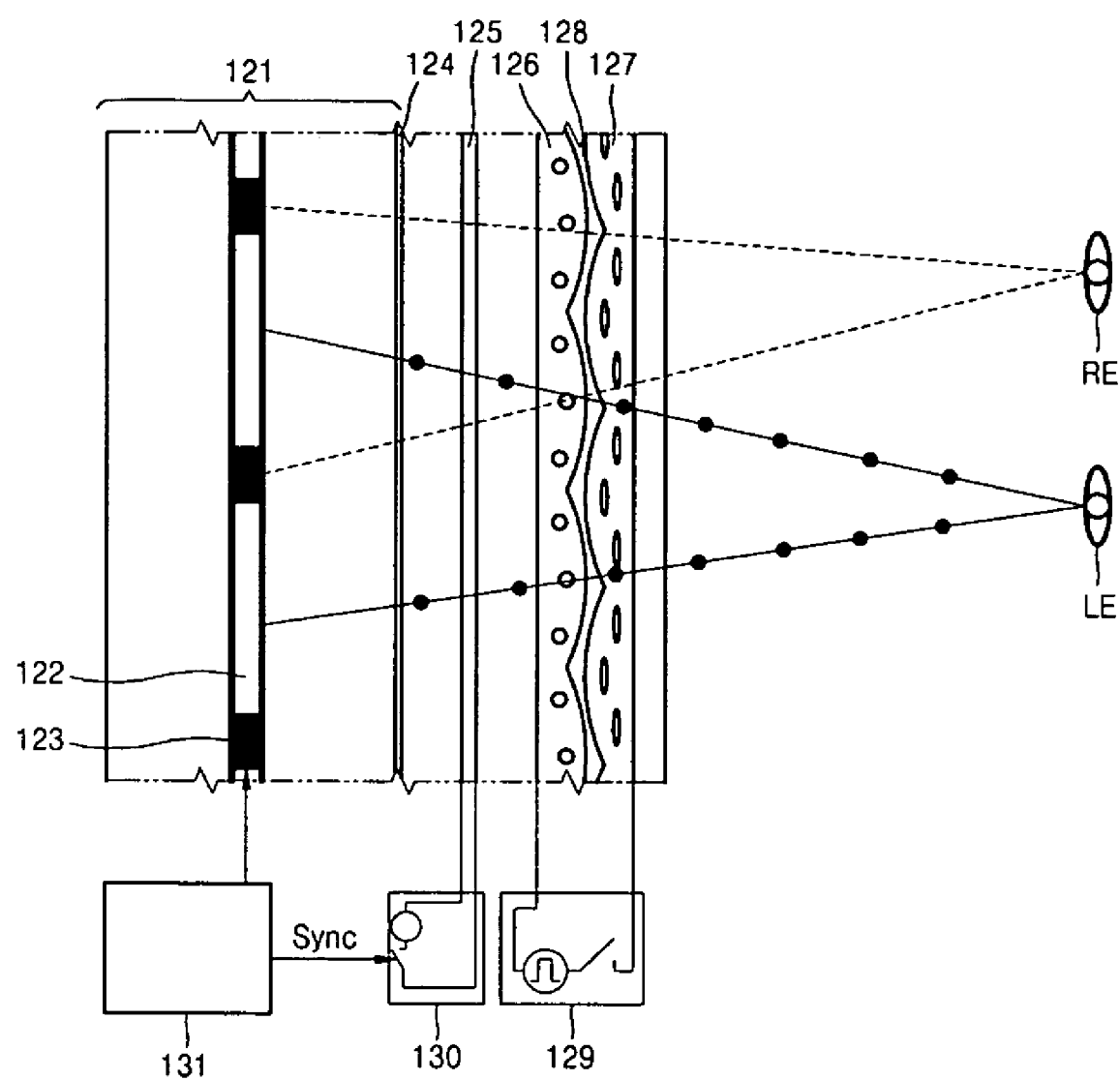
FIGS. 4A and 4B illustrate the operation of the autostereoscopic display illustrated in FIG. 2 according to a polarizing direction of light.

FIG. 4A corresponds to FIG. 3A and illustrates the first polarization direction of light, a left eye viewing zone, formed as an image of pixels 122, and right eye viewing zone t formed by the inactive area 123 e.g. black matrix of LCD panel. Referring to FIG. 4A, the first electro-optical birefringent layer 126 selectively allows the left eye LE to see the image formed by the pixels 122 as represented by the solid lines and the right eye RE to see the black matrix as represented by dotted lines.

Figure 4B:
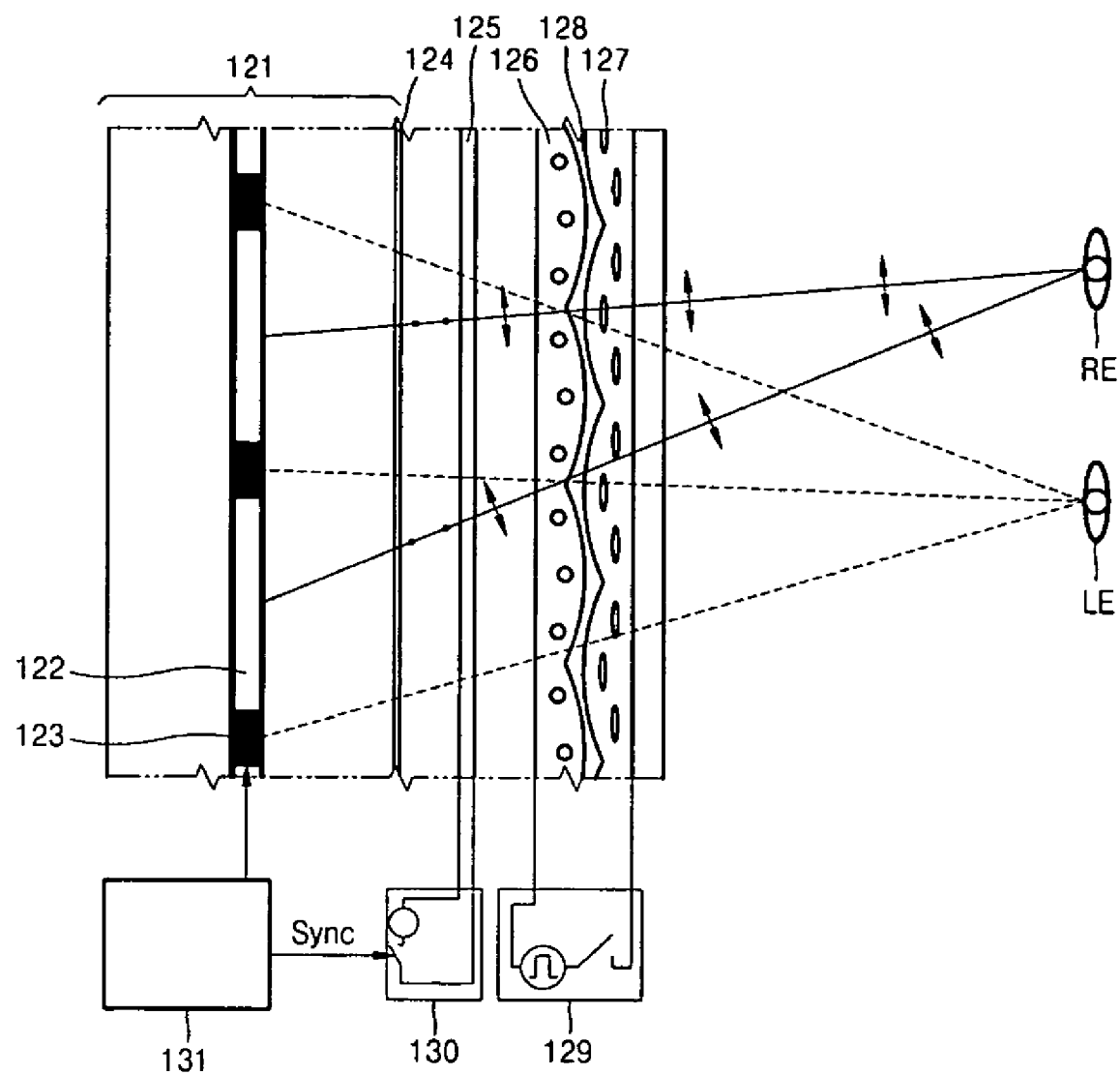

Referring to FIG. 4B corresponding to FIG. 3B, the second electro-optical birefringent layer 127 selectively allows the right eye RE to see the image formed by the pixels 122 as represented by the solid lines and the left eye LE to see the black matrix as represented by dotted lines.

Figure 5:
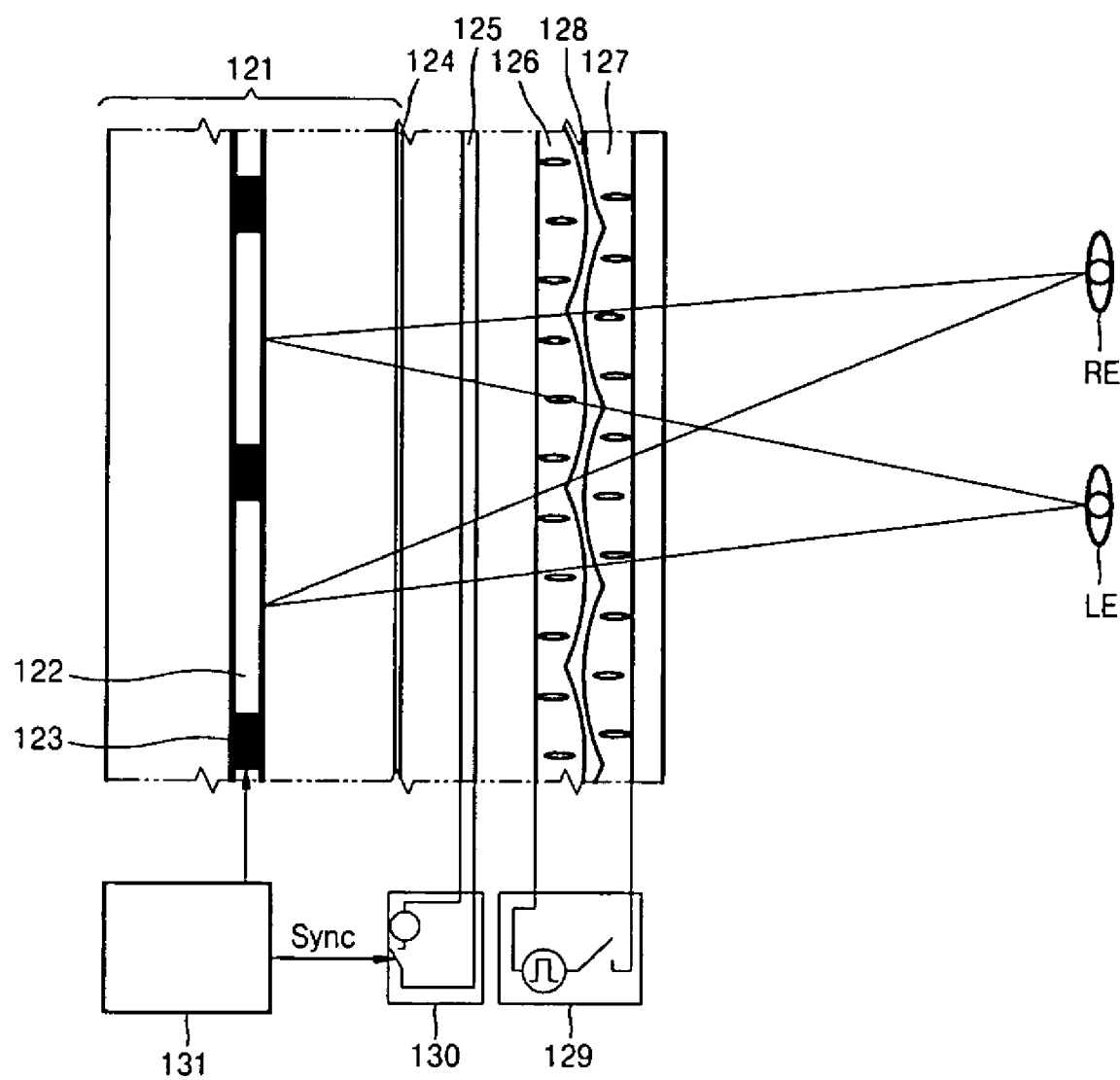
FIG. 5 illustrates the operation of the autostereoscopic display illustrated in FIG. 2 in a two-dimensional mode.

FIG. 5 illustrates the operation of the autostereoscopic display illustrated in FIG. 2 in a two-dimensional (2D) mode.

2D-3D mode conversion in the autostereoscopic display can be accomplished when the first and second electro-optical birefringent layers 126 and 127 are made of an electro-optical material whose refractive index changes in response to voltage control. Liquid crystal may be used as the electro-optical material. When a control voltage is applied to the first and second electro-optical birefringent layers 126 and 127 by the selection controller 129, the direction of the crystal optical axis changes. If the liquid crystal is used as the electro-optical material, when the voltage is applied to the first and second electro-optical birefringent layers 126 and 127, the direction of molecules of the liquid crystal changes, and the refractive index of the first and second electro-optical birefringent layers 126 and 127 is changed to an ordinary refractive index with respect to light polarized in any direction incident to a birefringent layer thus becomes the same as the refractive index of the separator 128. As a result, the first and second electro-optical birefringent layers 126 and 127 do not have optical power and operate as transparent optical plates so that a 2D image is displayed at full resolution.

In the case if 2D-3D switching is not necessary the first and second electro-optical birefringent layers 126 and 127 may be made of plastic or crystallic materials having a high birefringent or a liquid crystal polymer having a positive or negative index of birefringence.

Figure 6A:
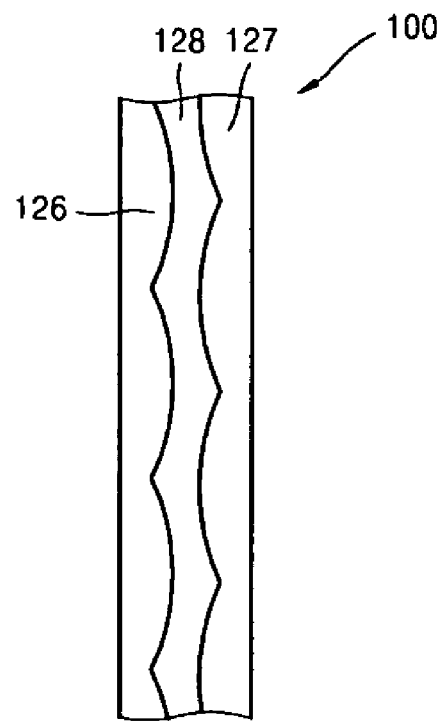
FIGS. 6A through 6D illustrate electro-optical units used in an autostereoscopic display according to exemplary embodiments of the present invention.
Figure 6B:
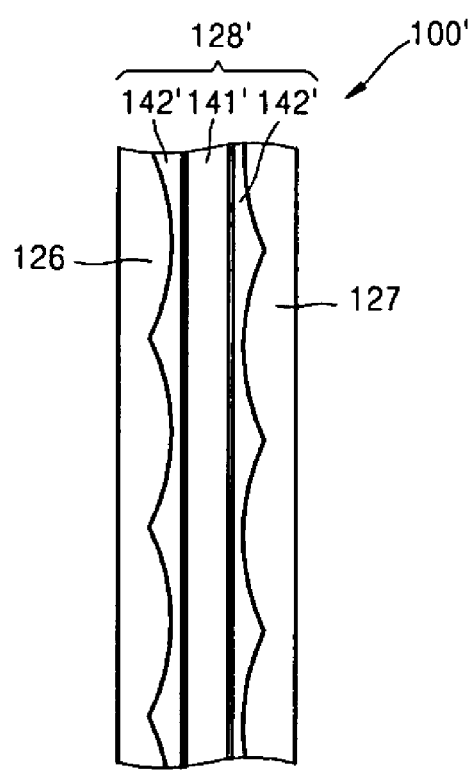
Figure 6C:
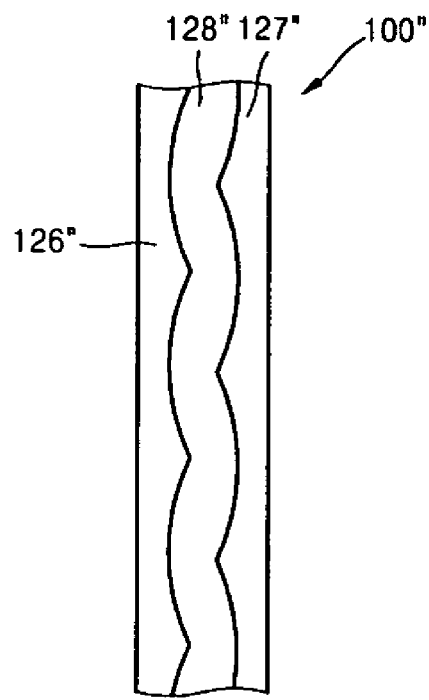
Figure 6D:
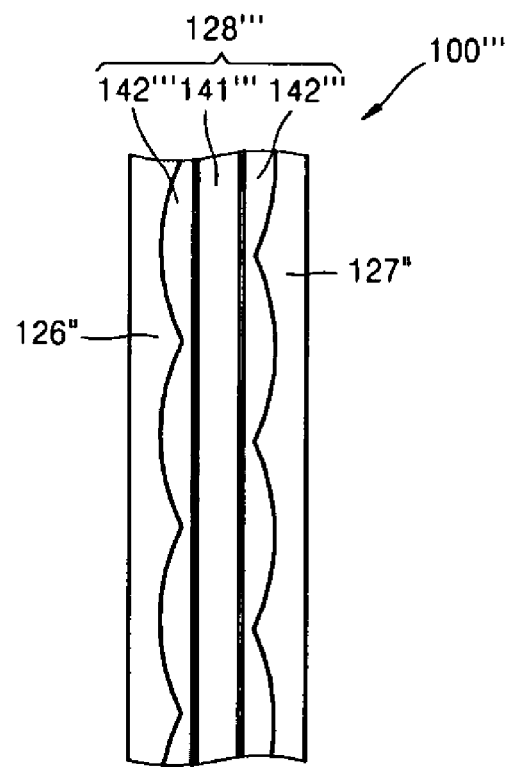

FIGS. 6A through 6D illustrate structures of an electro-optical birefringent unit for providing electro-optical switching according to exemplary embodiments of the present invention. Referring to FIGS. 6A through 6D, the electro-optical birefringent unit may be a positive type in which the first and second electro-optical birefringent layers 126 and 127 have a convex profile, as shown in FIGS. 6A and 6B, or a negative type in which the first and second electro-optical birefringent layers 126 and 127 have a concave profile, as shown in FIGS. 6C and 6D. The electrooptical birefringent layer made of material with positive type is profiled so that it has positive refractive power while the electrooptical birefringent layer made of material with a negative type is profiled so that has negative refractive power. The electro-optical birefringent unit 100 may have a homogeneous separator unit 128 to separate two layers of liquid crystal made of an isotropic transparent material, as shown in FIG. 6A. Alternatively, an electro-optical birefringent unit 100' may have a hybrid separator 128' including a plane glass substrate 141' and sub-separators 142' formed on both sides of the plane glass substrate 141', as shown in FIG. 6B.

An electro-optical birefringent unit 100" having negative birefringence illustrated in FIG. 6C has a homogeneous separator 128" and first and second layers 126" and 127" having negative birefringence formed on both sides of the separator 128". Referring to FIG. 6D, an electro-optical birefringent unit 100''' having negative birefringence is a hybrid unit including a plane glass substrate 141''' and sub-separators 142''' formed on both sides of the plane glass substrate 141'''.

Figure 7:
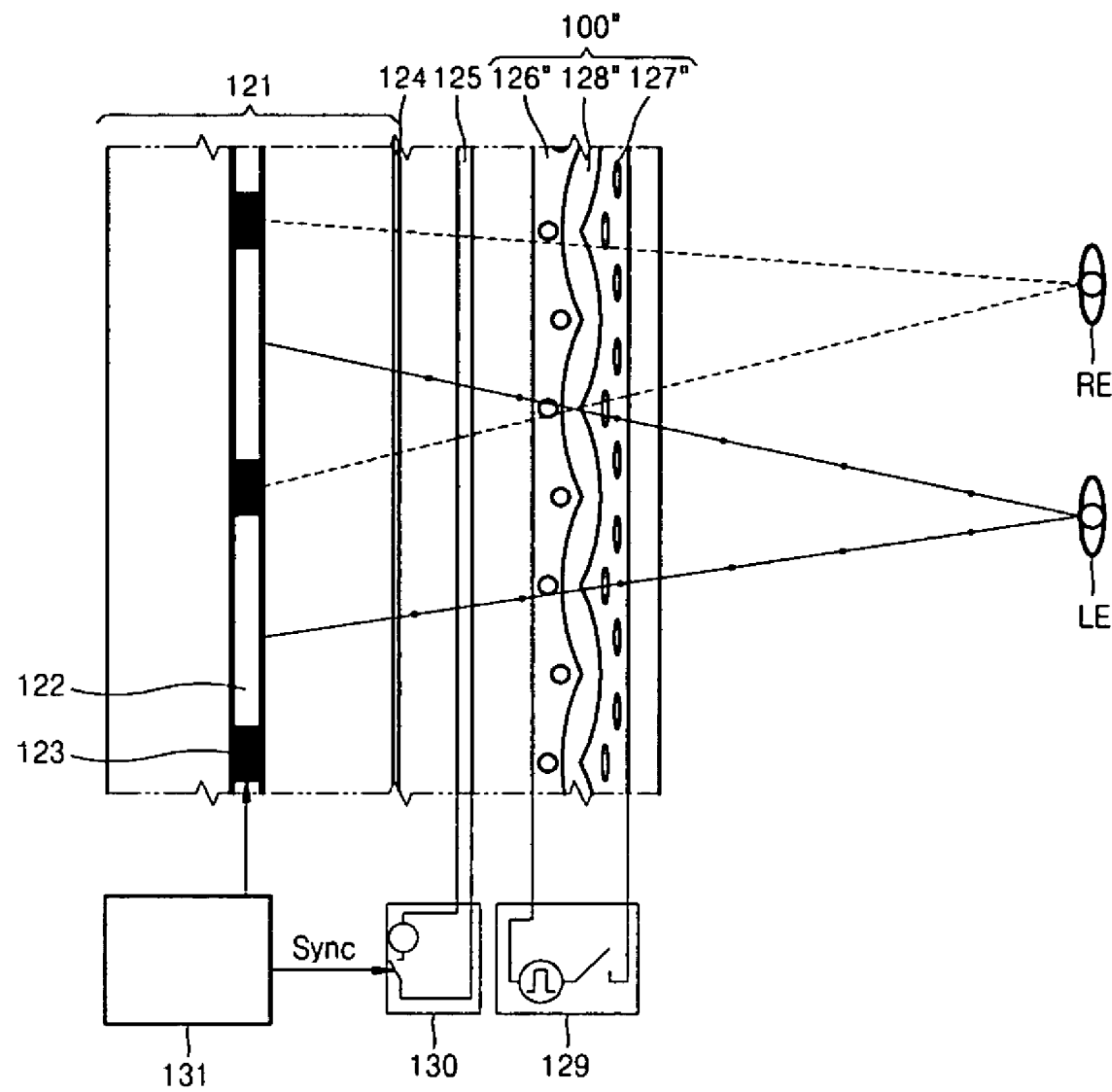
FIG. 7 illustrates an autostereoscopic display using the electro-optical unit illustrated in FIG. 6C.

Various modifications may be made to the structure of an electro-optical birefringent unit according to exemplary embodiments of the present invention. The autostereoscopic display illustrated in FIG. 2 includes a positive birefringent unit with a homogeneous separator. FIG. 7 illustrates an autostereoscopic display including the negative birefringence electro-optical unit 100" illustrated in FIG. 6C. When a liquid crystal material having negative birefringence is used as an electro-optical birefringent layer, the separator 128" serves as a positive lenticular lens.

The present invention provides an autostereoscopic display that provides a 3D image with the full resolution of a display panel and allows 2D-3D image conversion. A display according to the present invention can be accomplished using the fast response and high transmission rate of a flat panel such as an TN LCD or FELCD panel for television, computer graphics, and other applications. In addition, the present invention uses a pair of electro-optical birefringent layers which are displaced from each after by half the pitch, thereby providing a stereoscopic image having a full resolution and facilitating 2D-3D conversion. In addition, the present invention has a simple structure, thereby facilitating manufacturing and having a small overall thickness.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. An autostereoscopic display comprising:
    a display panel receiving an image signal from a controller, forming an image, and including pixels and an inactive area between the pixels;

a polarizer polarizing light emitted from the display panel to a first polarization;

a polarization switch selectively converting the light with the first polarization into light with a second polarization in response to the electrical control of a polarization switching controller;

a 2D-3D selection controller;

a first electro-optical birefringent layer having a crystal optical axis that is changed by an electrical control of the selection controller and comprising a plurality of first lenticular lenses separated by a predetermined pitch; and a second electro-optical birefringent layer having a crystal optical axis that is changed by the electrical control of the selection controller and comprising a plurality of second lenticular lenses that have the same pitch as the first lenticular lenses and are parallel to the first lenticular lenses and are shifted by half the pitch from the first lenticular lenses.

2. The autostereoscopic display of claim 1, further comprising a separator between the first electro-optical birefringent layer and the second electro-optical birefringent layer, the separator having a refractive index equal to an ordinary refractive index of the first and second electro-optical birefringent layers.

3. The autostereoscopic display of claim 1, wherein the first and second electro-optical birefringent layers have positive refractive power or have negative refractive power.

4. The autostereoscopic display of claim 2, wherein profiles of the separator corresponds to profiles of the first and second electro-optical birefringent layers.

5. The autostereoscopic display of claim 2, wherein the separator comprises a plane glass substrate and sub-separators on both sides of the plane glass substrate.

6. The autostereoscopic display of claim 5, wherein the sub separators have convex profiles.

7. The autostereoscopic display of claim 5, wherein the sub-separators have concave profiles.

8. The autostereoscopic display of claim 1, wherein the controller transmits a sync signal to the polarization switching controller.

9. The autostereoscopic display of claim 2, wherein the pitch of the first and second lenticular lenses is equal to or less than a horizontal pitch between the pixels of the display panel.

10. The autostereoscopic display of claim 9, wherein, the pitch of the first and second lenticular lenses satisfies the following equation:

$$P_L = \frac{P_0}{1 + \left(\frac{T}{L}\right)},$$

where $P_1$ is the pitch of the first and second lenticular lenses, $P_0$ is the horizontal pitch between the pixels of the display panel, T is the optical distance from the pixels to a vertices of the first lenticular lenses, L is a viewing distance, and n is the mean refractive index of the separator.

11. The autostereoscopic display of claim 1, wherein the number of the first lenticular lenses and the number of the second lenticular lenses are both the same or greater as the number of pixels in a row in the display panel.

12. The autostereoscopic display of claim 1, wherein, the first electro optical birefringent layer has a ordinary refractive index with respect to light having the first polarization and has an extraordinary refractive index with respect to light having the second polarization and the second electro-optical birefringent layer has the extraordinary refractive index with respect to light having the first polarization and has the ordinary refractive index with respect to light having the second polarization according to a voltage control of the 2D-3D selection controller.

13. The autostereoscopic display of claim 1, wherein, the first and second electro-optical birefringent layers have a ordinary refractive index with respect to an incident light to display an image in a two-dimensional mode according to a voltage control of the selection controller.

14. The autostereoscopic display of claim 1, wherein the first and second electro-optical birefringent layers comprise a liquid crystal.

15. The auto stereoscopic display of claim 1, wherein the crystal optical axis of the first electro-optical birefringent layer is perpendicular to the crystal optical axis of the second electro-optical birefringent layer.

16. The autostereoscopic display of claim 1, wherein the crystal optical axis of the first electro-optical birefringent layer is parallel to the crystal optical axis of the second electro-optical birefringent layer.

* * * * *